Feb. 13, 1968               S. SCHNEIDER                    3,368,260
METHOD OF CONNECTING A TUBE TO A ROLL BONDED
SHEET METAL FLUID CONTAINER
Filed Oct. 19, 1964                                     4 Sheets-Sheet 2

INVENTOR.
Siebert Schneider
BY Carl A. Stickel
His Attorney

INVENTOR.
Siebert Schneider
His Attorney

Feb. 13, 1968            S. SCHNEIDER            3,368,260
METHOD OF CONNECTING A TUBE TO A ROLL BONDED
SHEET METAL FLUID CONTAINER
Filed Oct. 19, 1964            4 Sheets-Sheet 4
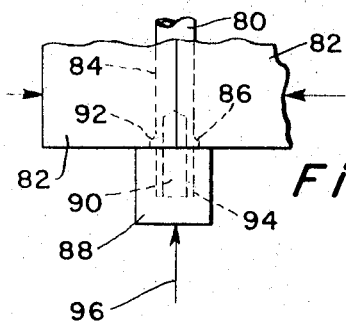
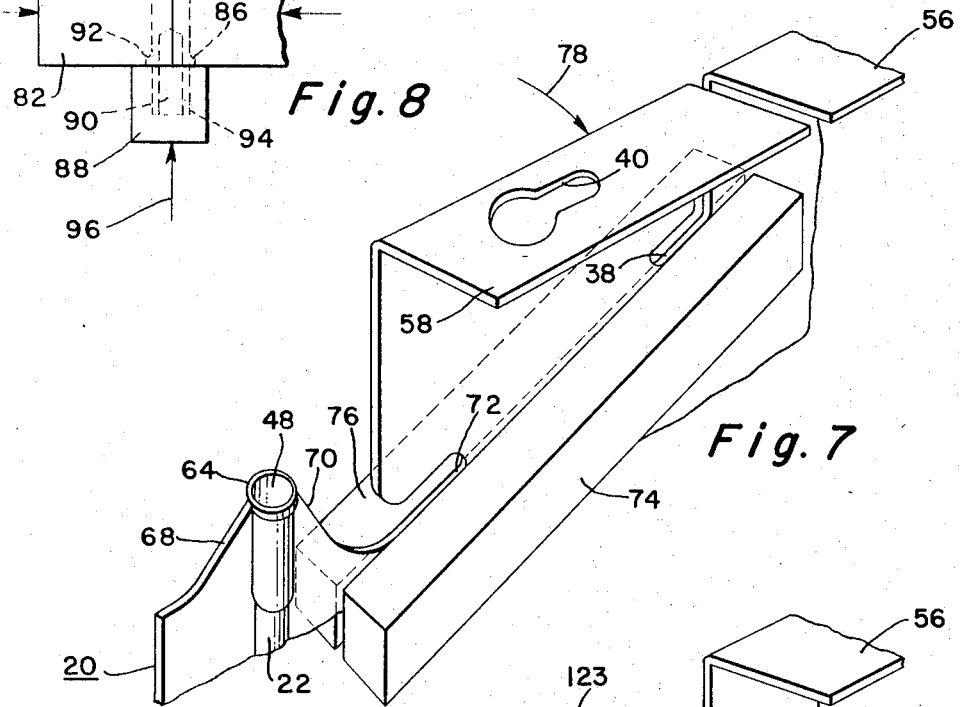
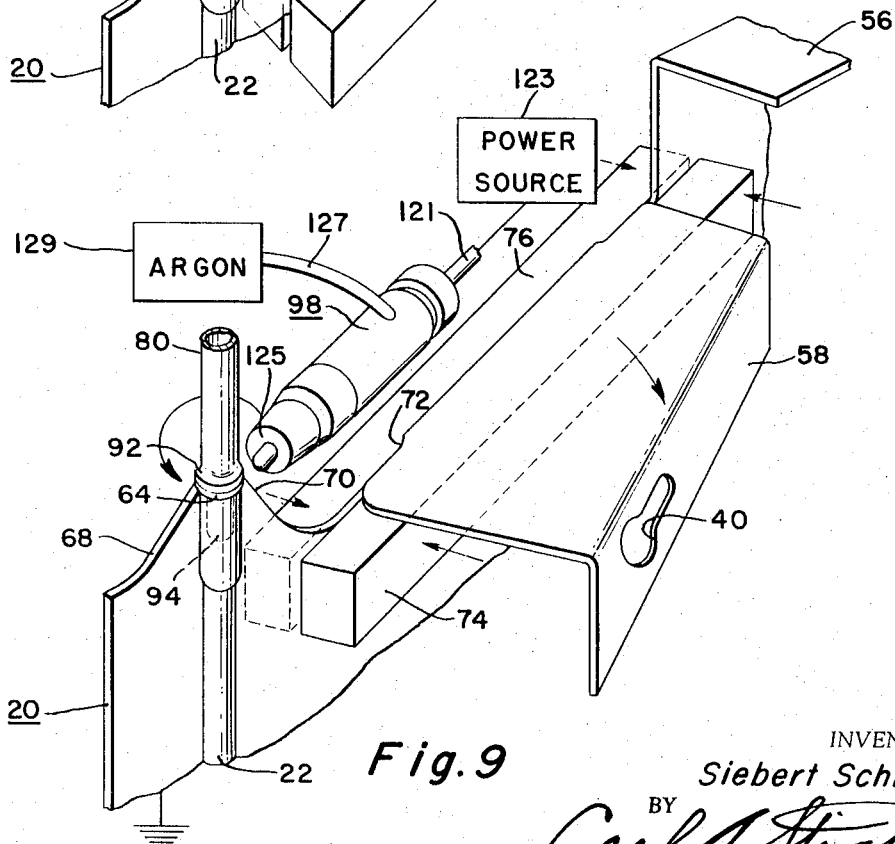
INVENTOR.
Siebert Schneider
BY Carl A Stickel
His Attorney

United States Patent Office 3,368,260
Patented Feb. 13, 1968

3,368,260
METHOD OF CONNECTING A TUBE TO A ROLL BONDED SHEET METAL FLUID CONTAINER
Siebert Schneider, Dayton, Ohio, assignor to General Motors Corporation, Detroit, Mich., a corporation of Delaware
Filed Oct. 19, 1964, Ser. No. 404,743
2 Claims. (Cl. 29—157.3)

ABSTRACT OF THE DISCLOSURE

In the preferred form, the mouth of a passage in a roll bonded sheet aluminum evaporator is expanded and in two successive upsetting operations is provided with an upset circular rim. The sheet metal on opposite sides of the circular rim is cut away at a diverging angle. A tube is inserted into the mouth of the passage until an annular bead thereon engages the upset rim. A Heliarc welding gun is electrically energized and passed in a circle around the bead and rim while argon gas flows to electrically weld the bead to the rim.

---

This invention pertains to refrigerating apparatus and more particularly to a method of bonding tubing such as aluminum tubing to sheet metal containers such as roll bonded sheet aluminum evaporators as may be used for refrigerators.

Sheet aluminum containers are very popular for refrigerant evaporators. However there always has been difficulty in connecting aluminum tubing to such an evaporator, particularly because automatic welding equipment could not be used and manual welding is less reliable and more expensive and particularly produces more leaky joints.

It is an object of my invention to provide an improved process by which tubing such as aluminum tubing can be economically welded by automatic welding equipment to a sheet metal container such as a roll bonded sheet aluminum evaporator.

It is another object of my invention to provide an improved process by which the entrance passage and surrounding parts of a sheet metal container such as a roll bonded sheet aluminum evaporator are processed in such a way that automatic equipment such as an automatic Heliarc welding gun may be passed around the connecting joint being made with the connecting aluminum tubing.

These and other objects are attained in the form shown in the drawings in which a roll bonded sheet aluminum evaporator containing expanded refrigerant passages is first trimmed to expose the entrance or exit mouth of the evaporator. The mouth and the adjacent portions of the passage are then mechanically expanded and in two successive upsetting operations the mouth of the passage is provided with an upset circular rim. The sheet metal on opposite sides of the rim is cut away at a diverging angle so as to provide room for a Heliarc welding gun to circle the upset rim. The adjacent portions of the sheet metal are folded away to provide further room for the circular movement of the Heliarc welding gun around the upset rim.

After this, the end of the tubing which has been provided with an annular upset bead spaced from the end thereof is inserted into the mouth of the passage until the bead engages the upset rim. While the bead is held firmly in contact with the upset rim, a Heliarc welding gun is passed in a circle around the bead and rim and electrical energy is applied to the gun from a power source while argon gas flows from the gun to electrically weld the bead to the rim in an argon atmosphere to provide a strong substantially leakproof joint. The short end of the tubing adjacent the bead fits into the mouth of the entrance or exit passage of the evaporator and prevents the entrance of any melted metal into the refrigerant passage of the evaporator. The portion extending into the passage also limits the bending stresses applied to the joint so that the joint is protected from breaking stresses and provides a durable sealed section between the tubing and the refrigerant passage in the evaporator.

Further objects and advantages of the present invention will be apparent from the following description, reference being had to the accompanying drawings wherein a preferred embodiment of the present invention is clearly shown.

In the drawings:

FIG. 7 is a fragmentary perspective view similar to FIGS. 1 to 6 illustrating the cutting away of the sheet metal around the upset rim at the entrance or exit of the refrigerant passage;

FIG. 8 is a view in elevation showing the end portion of a refrigerant tube in an upsetting fixture providing an upset bead spaced from the end of the tubing; and FIG. 9 is a fragmentary perspective view similar to FIGS. 1 to 7 showing a part of the flanged portion of the evaporator bent out of the way and the electric arc welding gun being passed in a circular orbit around the upset rim and bead to join by Heliarc welding the tube to the sheet metal evaporator.

Figure 1:
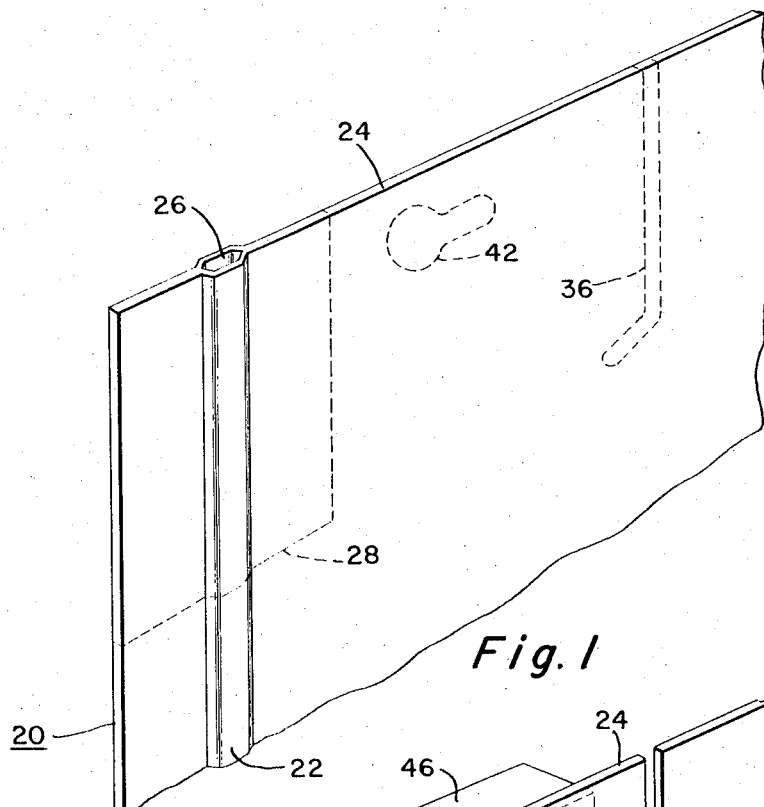
FIG. 1 is a fragmentary perspective view of a roll bonded sheet aluminum evaporator showing the entrance or exit portion of the refrigerant passages as initially formed.

The container forming the subject matter of this invention may be any suitable type of sheet metal container. However as a specific example of this invention, the container intended for use as a refrigerant evaporator is a roll bonded sheet aluminum container preferably made by the process shown in Patent No. 2,662,273, issued Dec. 15, 1953 in which the refrigerant passages are formed by hydraulic expansion of nonbonded areas as illustrated in said patent. A pertinent portion of such sheet metal evaporator 20 is illustrated in FIG. 1 in which the expanded refrigerant passageway 22 extends to an edge 24 of the sheet and is provided with a combined entrance and exit 26. Such a combined entrance and exit arrangement is illustrated in Patent No. 2,760,346, issued Aug. 28, 1956. However the present invention is applicable when the tubing is connected to either an entrance or an exit passage as well as a combined exit and entrance passage such as is illustrated in said patent.

Figure 2:
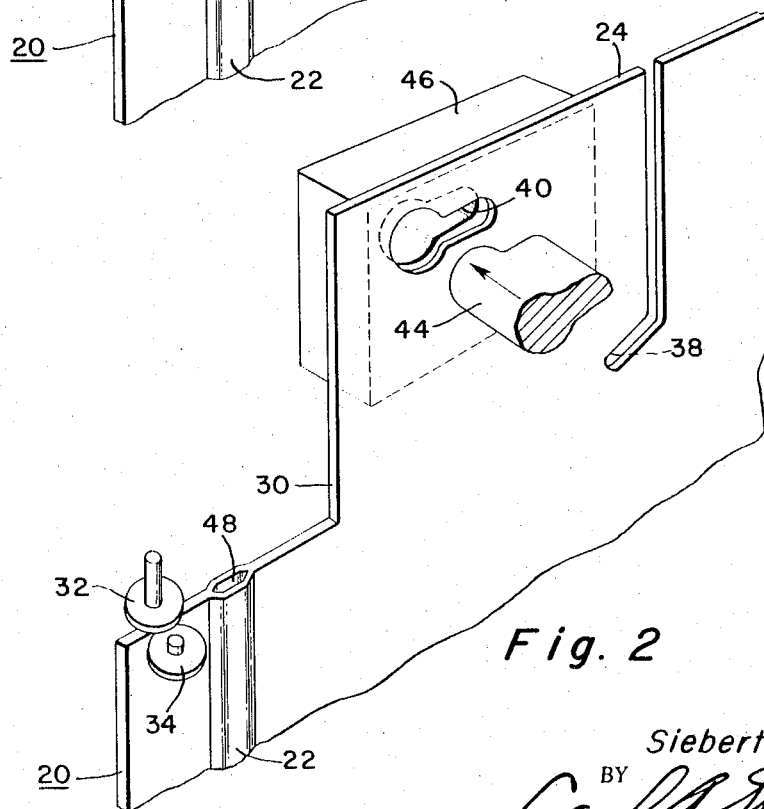
FIG. 2 is a fragmentary perspective view similar to FIG. 1 illustrating the trimmed entrance or exit portion and preliminary trimming of the evaporator.
Figure 3:
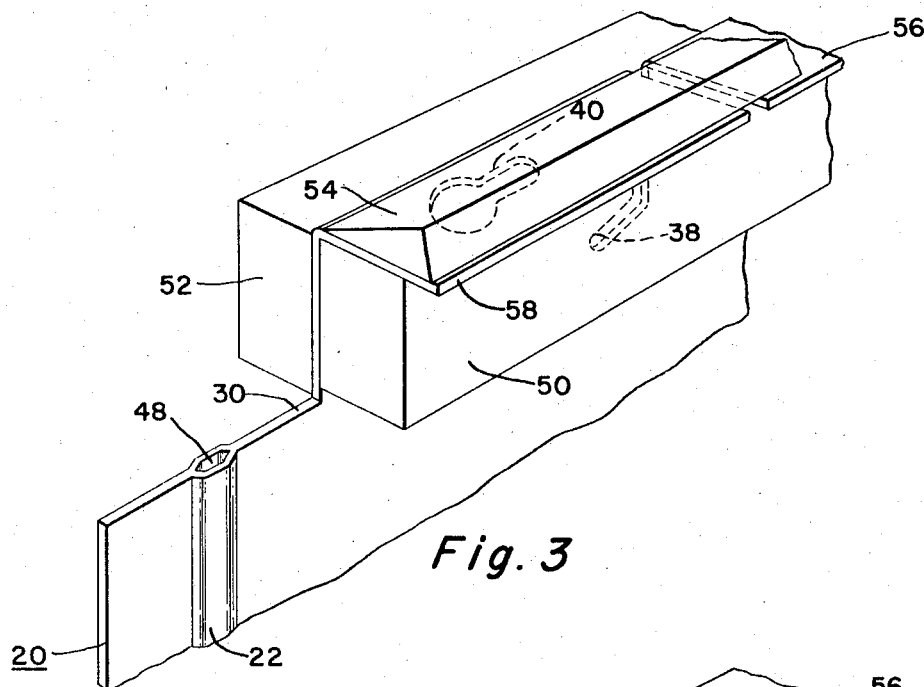
FIG. 3 is a fragmentary perspective view similar to FIGS. 1 and 2 illustrating the completion of the bent flange at the top of the evaporator.
Figure 4:
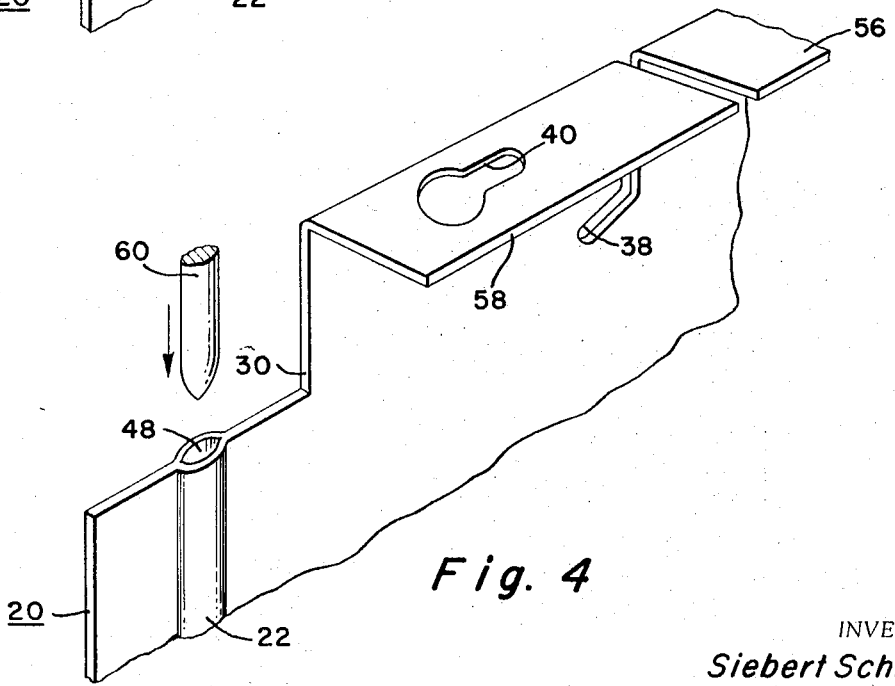
FIG. 4 is a fragmentary perspective view similar to FIGS. 1 to 3 showing the insertion of an expanding tool into the entrance or exit of the refrigerant passageway.
Figure 5:
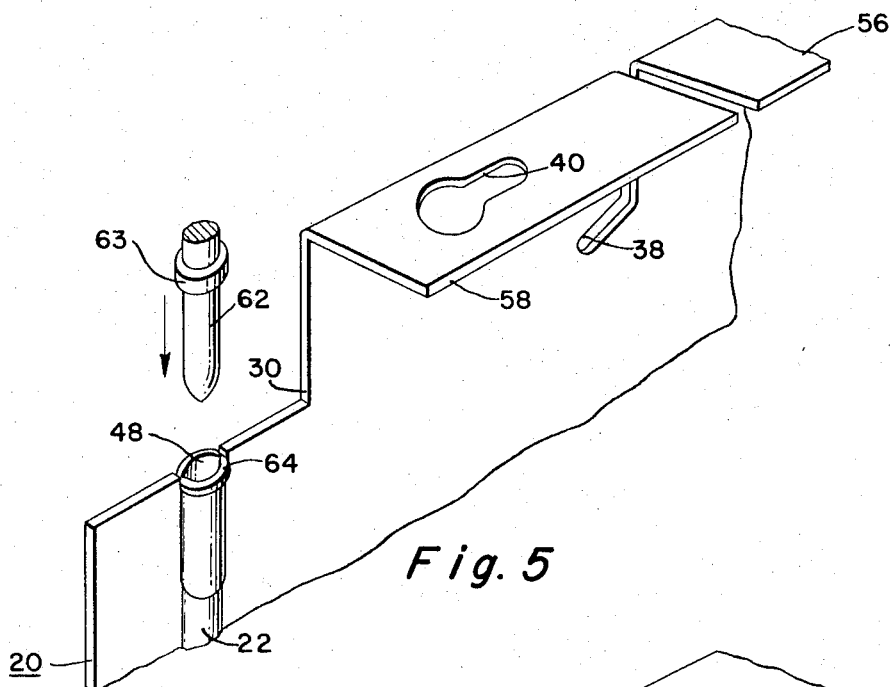
FIG. 5 is a fragmentary perspective view similar to FIGS. 1 to 4 illustrating the first upsetting operation of the entrance or exit of the refrigerant passageway.

To properly locate the mouth of the passage to which the tubing is to be connected, the evaporator 20 is cut along the dotted lines 28 illustrated in FIG. 1 to form the notched corner 30 illustrated in FIG. 2. This cutting can be accomplished through the use of cutting shears or cutting dies or cutting rollers such as the cutting rollers 32 and 34 illustrated in FIG. 2. Such cutting shears, dies or rollers may also be used to make the cut along the dotted lines 36 to form the slot 38. To form the key hole slot 40, the sheet metal is cut along the dotted lines 42 by a punch 44 which cooperates with a suitable die 46 as illustrated in FIG. 2. The cutting of the notch 30 provides a new mouth 48 which serves as the functional combined entrance and exit passage to be connected to the tubing. As illustrated in FIG. 3 diagrammatically, the sheet metal evaporator 20 is clamped between the blocks 50 and 52 in a break machine illustrated diagrammatically in which the bending bar 54 is moved from a vertical position to a horizontal position to form the flanges 56 and 58.

Figure 6:
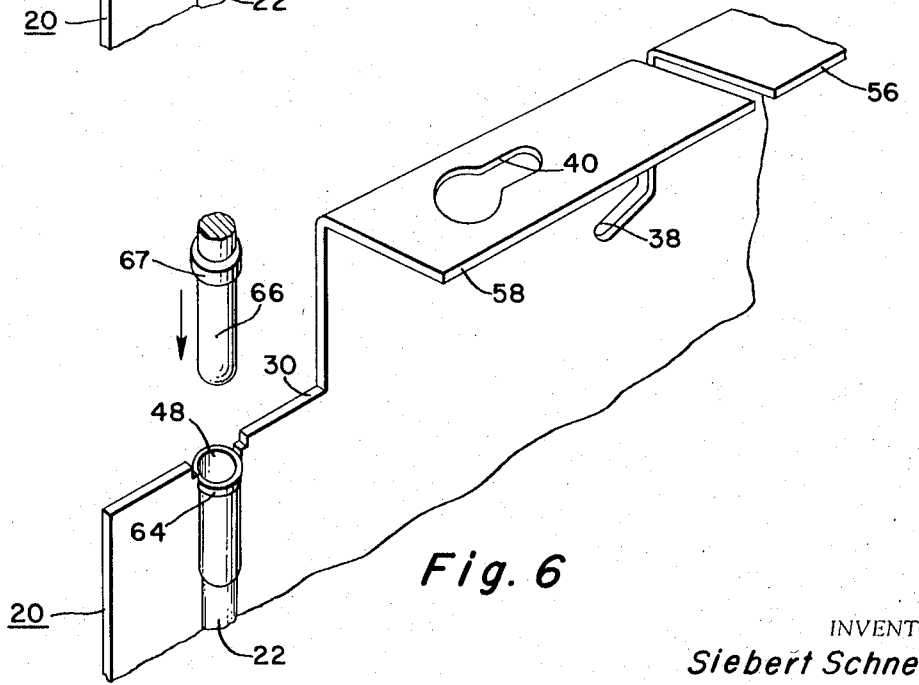
FIG. 6 is a fragmentary pespective view similar to FIGS. 1 to 5 illustrating the second upsetting operation applied to the entrance or exit of the refrigerant passageway.

Following this, the mouth 48 and the adjacent portions of the refrigerant passage 22 are enlarged to a fully cylindrical shape by the insertion of the pointed cylindrical piercing tool 60 through the mouth 48 of the passage 22 to a distance of about 1″. This is followed by the first upsetting operation illustrated in FIG. 5 in which the first upsetting tool 62 is forced into the mouth 48 of the passage 22 repeatedly until a circular upset rim 64 is formed at the entrance and exit of the passage 22. This tool 62 is provided with a pointed cylindrical end having an annular upsetting projection 63 which hammers or coins the sheet metal around in mouth 48 to form the rim 64. Following this, as illustrated in FIG. 6, a second upsetting tool 66 provided with an annular upsetting projection 67 is repeatedly inserted into the mouth 48 until the circular rim 64 is enlarged to the size shown in FIG. 6.

After this, a cutting die or rotary cutter such as the cutters 32 and 34 are used to cut away the sheet metal along lines extending divergingly downwardly at an angle from the opposite sides of the upset rim 64 to form the edge 68 extending downwardly at about a 45° angle away from the rim 64 and also forming an edge 70 on extending downwardly at an angle of about 45° away from the rim 64 on the side opposite the edge 68 which extends in a curve to form a notch 72. The sheet metal container is clamped beneath the notches 38 and 72 between the two clamping blocks 74 and 76 and the flanged portion 58 is bent over the clamp block 74 to the position shown in FIG. 9 by the application of a force indicated by the arrow 78 sufficient to cause the bending to the position illustrated in FIG. 9. This operation clears the area around the circular rim 64.

The tubing 80 to be joined to the evaporator 20 is clamped in a set of clamping blocks 82 provided with a recess 84 for clamping the tubing 80 and an annular recess 86 for forming a bead. A cap-shaped upsetting die 88 having a concentric pin 90 extending into the tubing is provided for upsetting and forming a bead 92 in the recess 86 at a distance spaced from the end of the tubing. The end portion 94 of the tubing 80 projects into the die 88. The upsetting is accomplished by applying repeatedly a force indicated by the arrow 96 upon the die 88 against the inserted end 94 of the tubing 90 causing an intermediate portion of the tubing to be upset into the recess 86 to form the bead 92 thereon spaced from the adjacent end of the tubing.

The tubing 80 is then removed from the clamping blocks 82 and the die 88 and the end portion 94 is inserted through the mouth 48 of the passage 22 within the upset rim 64 as indicated in FIG. 9 until the bead 92 abuts the rim 64 firmly. While the bead 92 is held firmly in engagement with the rim 64, a Heliarc-type welding device 98 has its electrode 121 connected to a suitable power source 123 and has a passage connecting with the mouth 125 of the gun 98 connected by the tubing 127 to a container 129 providing a source of argon gas. The power source 123 may be an alternating current arc welder having an output of 80 v. and 200 amps for Heliarc welding. One suitable power source is the Miller AC arc welder, model 202R, manufactured by the Miller Electrical Mfg. Co. of Appleton, Wis.

The Heliarc welder 98 is a part of an automatic Heliarc welding machine and has its electrode 121 automatically directed toward and held at a proper distance from the bead 92 and the rim 64. After the power source 123 is energized and the argon gas is passed through the tube 127 to the mouth 125 of the arc welder 98, under automatic control, the arc welding device 98 is rotated around the circumference of the bead 92 and the rim 64 as illustrated in FIG. 9 with the adjacent end of the electrode 121 being maintained at the optimum distance from the joint between the bead 92 and the rim 64 with the welding current passing from the electrode 121 to the bead 92 and the rim 64 to weld them together in the argon atmosphere. Since the tubing 80 and the evaporator 20 are preferably of aluminum or aluminum alloy, the Heliarc welding process forms a strong leak-proof joint through the use of such an automatic Heliarc welding machine. Upon the completion of the Heliarc welding, the bracket 58 may be returned to the position shown in FIG. 7 by an application of force thereto in the reverse direction; namely, in the direction opposite the force indicated by the arrow 78.

The application of the automatic Heliarc welding process to the making of this joint between the tubing and the evaporator greatly reduces the number of leaky joints made and also markedly reduces the cost of making the connection.

While the embodiment of the present invention as herein disclosed, constitutes a preferred form, it is to be understood that other forms might be adopted.

What is claimed is as follows:

1. The method of connecting a tube provided with an endless bead to a roll bonded sheet metal fluid container having a passage extending to an edge portion including opening the mouth of the passage into a cylindrical shape, upsetting the sheet metal wall surrounding the mouth of the passage into a circular rim, cutting away at an acute angle the sheet metal alongside the circular rim, abutting a bead upon a tube against said circular rim, and passing a bonding device in a circular path around said tube adjacent said rim to bond said bead to said rim.

2. The method of connecting a tube provided with an endless bead to a roll bonded sheet metal fluid container having a passage extending to an edge portion including opening the mouth of the passage into a cylindrical shape, upsetting the sheet metal wall surrounding the mouth of the passage into a circular rim, cutting away inwardly at an acute angle from the circular rim the sheet metal adjacent the rim, folding sheet metal portions of the container away from the immediate vicinity of the circular rim to clear the area for further processing, abutting a bead upon a tube against the circular rim, passing a bonding device in a circular path around said tube adjacent said rim to bond said bead to said rim, and reshaping the folded sheet metal portions to the final desired shape.

(References on following page)

References Cited

UNITED STATES PATENTS

| | | | |
|---|---|---|---|
| 2,674,105 | 4/1954 | Prosek | 29—479 X |
| 2,740,188 | 4/1956 | Simmons | 29—157.3 |
| 2,781,645 | 2/1957 | Simmons | 29—157.3 X |
| 2,795,039 | 6/1957 | Hutchins | 29—157.3 X |
| 2,977,675 | 4/1961 | Simms | 29—479 |
| 2,988,811 | 6/1961 | Huet | 29—479 |
| 2,996,600 | 8/1961 | Gardner | 29—482 X |
| 3,004,327 | 10/1961 | Keith | 29—157.3 X |
| 3,133,517 | 5/1964 | Brick | 29—157.3 X |
| 3,140,532 | 7/1964 | Adams | 29—157.3 |

FOREIGN PATENTS 228,119   5/1960   Australia.

JOHN F. CAMPBELL, *Primary Examiner.*

R. F. DROPKIN, *Assistant Examiner.*